(12) United States Patent
Geisen

(10) Patent No.: US 10,908,589 B2
(45) Date of Patent: Feb. 2, 2021

(54) METHOD FOR DETERMINING THE ORIENTATION OF A PART TO BE ADDITIVELY MANUFACTURED, AND COMPUTER-READABLE MEDIUM

(71) Applicant: Siemens Aktiengesellschaft, Munich (DE)

(72) Inventor: Ole Geisen, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/077,548

(22) PCT Filed: Feb. 21, 2017

(86) PCT No.: PCT/EP2017/053845
§ 371 (c)(1),
(2) Date: Aug. 13, 2018

(87) PCT Pub. No.: WO2017/157620
PCT Pub. Date: Sep. 21, 2017

(65) Prior Publication Data
US 2019/0049921 A1 Feb. 14, 2019

(30) Foreign Application Priority Data
Mar. 17, 2016 (DE) .................. 10 2016 204 412

(51) Int. Cl.
*B22F 3/105* (2006.01)
*B29C 64/386* (2017.01)
(Continued)

(52) U.S. Cl.
CPC ........ *G05B 19/4099* (2013.01); *B22F 3/1055* (2013.01); *B29C 64/386* (2017.08);
(Continued)

(58) Field of Classification Search
CPC ........ G05B 19/4099; G05B 2219/3513; G05B 2219/35161; G05B 2219/49023;
(Continued)

(56) References Cited

U.S. PATENT DOCUMENTS 5,155,324 A 10/1992 Beaman et al.
7,010,472 B1 3/2006 Vasey-Glandon et al.
(Continued)

FOREIGN PATENT DOCUMENTS

CN 104050314 A 9/2014
CN 104712371 A 6/2015
(Continued)

OTHER PUBLICATIONS

Padhye et al, Multi-objective Optimisation and Multi-criteria Decision Making in SLS Using Evolutionary Approaches, Dec. 24, 2009 (Year: 2009).*
(Continued)

*Primary Examiner* — Jennifer L Norton

(57) ABSTRACT

A method for determining the orientation of a part that is to be additively manufactured includes providing a geometry for the part to be additively manufactured, defining a property of the part to be additively manufactured, analyzing a directional dependency of the property in accordance with the geometry of the part, and determining a preferred orientation of the part to be additively manufactured in an additive manufacturing plant on the basis of the analysis of the directional dependency.

12 Claims, 2 Drawing Sheets

(51) Int. Cl.
| | | |
|---|---|---|
| *B33Y 10/00* | (2015.01) | |
| *B33Y 50/00* | (2015.01) | |
| *B33Y 50/02* | (2015.01) | |
| *G06F 119/18* | (2020.01) | |
| *G06F 30/17* | (2020.01) | |
| *G06F 30/23* | (2020.01) | |
| *G05B 19/4099* | (2006.01) | |
| *G06F 111/10* | (2020.01) | |

(52) U.S. Cl.
CPC ............... *B33Y 10/00* (2014.12); *B33Y 50/00* (2014.12); *B33Y 50/02* (2014.12); *G06F 30/17* (2020.01); *B22F 2003/1056* (2013.01); *B22F 2003/1057* (2013.01); *G05B 2219/35134* (2013.01); *G05B 2219/35161* (2013.01); *G05B 2219/49023* (2013.01); *G06F 30/23* (2020.01); *G06F 2111/10* (2020.01); *G06F 2119/18* (2020.01); *Y02P 10/25* (2015.11)

(58) Field of Classification Search
CPC ......... B33Y 10/00; B33Y 50/00; B33Y 50/02; B29C 64/386; B22F 3/1055; B22F 2003/1056; B22F 2003/1057; G06F 17/5086; G06F 17/5018; G06F 17/12; G06F 17/16; Y02P 10/295
See application file for complete search history.

(56) References Cited

U.S. PATENT DOCUMENTS

| | | | | |
|---|---|---|---|---|
| 2004/0056022 | A1 | 3/2004 | Meiners et al. | |
| 2012/0299918 | A1* | 11/2012 | Abeloe | B33Y 50/00 345/420 |
| 2014/0246813 | A1 | 9/2014 | Bauman et al. | |
| 2014/0277669 | A1 | 9/2014 | Nardi et al. | |
| 2015/0093283 | A1* | 4/2015 | Miller | A61F 2/3859 419/55 |
| 2015/0217520 | A1* | 8/2015 | Karpas | B33Y 30/00 700/98 |
| 2015/0251336 | A1* | 9/2015 | Goto | B29C 64/218 428/413 |
| 2015/0360288 | A1* | 12/2015 | Zalewski | B33Y 30/00 419/38 |
| 2016/0085882 | A1* | 3/2016 | Li | G06F 17/50 703/1 |
| 2017/0027624 | A1* | 2/2017 | Wilson | C22F 1/183 |
| 2017/0113414 | A1* | 4/2017 | Zeng | B29C 64/386 |
| 2017/0297103 | A1* | 10/2017 | Myerberg | B22F 3/22 |
| 2017/0351245 | A1* | 12/2017 | Zhang | B33Y 50/02 |
| 2018/0120816 | A1* | 5/2018 | Schwartz | B29C 64/393 |

FOREIGN PATENT DOCUMENTS

| | | | |
|---|---|---|---|
| CN | 105108142 | A | 12/2015 |
| EP | 1355760 | B1 | 5/2005 |
| EP | 2851145 | A1 | 3/2015 |
| JP | 2014516849 | A | 7/2014 |
| WO | 2013155500 | A1 | 10/2013 |
| WO | 2015015703 | A1 | 2/2015 |
| WO | 2015157703 | A2 | 10/2015 |

OTHER PUBLICATIONS

Hanzl Pavel et al: "The Influence of Processing Parameters on the Mechanical Properties of SLM Parts", Procedia Engineering, pp. 1405-1413, XP055621013, DOI: https://doi.org/10.1016/j.proeng.2015.01.510; 2015.

International Search Report dated May 8, 2017, for PCT/EP2017/053845.

Zhang, Yicha et al, "Build orientation optimization for multi-part production in additive manufacturing", Journal of Intelligent Manufacturing, Feb. 18, 2015, 15 pp, XP055364208, GB, ISSN: 0956-5515, DOI: 10.1007/10845-015-1057-1, New York, Problem description, Case study, fig. 6, 10.

Wikipedia: "Strukturanalyse/Strukturaufklärung", 3 pp, Version v. Jul. 20, 2015.

Wikipedia: "Rapid Prototyping", 4 pp, Version v. Mar. 23, 2015, recherchiert am Dec. 22, 2015, + Version v. Feb. 14, 2016, DPMA Jan. 19, 2017; 2015.

Wikipedia: "Computersimulation"; 3 pp, Version v. Mar. 11, 2016.

Padhye, Nikhil et al, "Multi-objective optimisation and multi-criteria decision making in SLS using evolutionary approaches", Rapid Prototyping Journal, vol. 17, No. 6, pp. 458-478, 2011, XP055365395, GB, ISSN: 1355-2546, DOI: 10.1108/13552541111184198; A Multi-objective optimization problem; pp. 460-461: "Multi-objective optimization problem"; p. 462: "Proposed approach"; pp. 464-465: "Decision making"; p. 466: "Experiments; pp. 466-476: Results and discussions"; figs 1-3, 8-18, p. 475: "Conclusions".

Moroni, Giovanni et al, "Functionality-based Part Orientation for Additive Manufacturing", PROCEDIA CI RP, vol. 36, pp. 217-222, 2015, XP055364211, NL ISSN: 2212-8271, DOI: 10.1016/j.procir.2015.01.015, the whole document.

Razvan, Pacurar et al, "Research on the Influence of the Orientation of Deposited Material on the Mechanical Properties of Samples Made from ABS M30 Material Using the 30 Printing Method", Applied Mechanics and Materials, vol. 809-810, 2015, pp. 429-434; Innovative Manufacturing Engineering: Selected, Peer Reviewed Papers From the 19th Innovative Manufacturing Engineering 2015 (IMANE 2015), May 21-22, IASI, Romania in: Applied Mechanics and Materials; XP008184235, 2015.

\* cited by examiner

METHOD FOR DETERMINING THE ORIENTATION OF A PART TO BE ADDITIVELY MANUFACTURED, AND COMPUTER-READABLE MEDIUM

CROSS REFERENCE TO RELATED APPLICATIONS

This application is the US National Stage of International Application No. PCT/EP2017/053845 filed Feb. 21, 2017, and claims the benefit thereof. The International Application claims the benefit of German Application No. DE 102016204412.5 filed Mar. 17, 2016. All of the applications are incorporated by reference herein in their entirety.

FIELD OF INVENTION

The present invention relates to a method for determining the orientation of a part to be additively manufactured, advantageously in or relative to a buildup direction in an additive manufacturing plant, and to a method for the additive manufacture of the part. Furthermore, the present invention relates to a computer-readable medium.

The part is advantageously an additively or generatively manufactured part or a part that is to be additively or generatively manufactured. In particular, it can be a workpiece or a part of a turbine, such as a steam or gas turbine.

BACKGROUND OF INVENTION

Known layer-wise, additive or generative manufacturing methods are in particular selective laser melting (SLM), selective laser sintering (SLS) and electron beam melting (EBM).

Additive manufacturing methods are used for producing three-dimensional objects by way of their iterative joining of layers, layer elements or volume elements, for example from the powder bed, and are frequently applied in the field of the production of prototypes and in the meantime also in part production, in particular in the manufacture of individually shaped parts. Typical layer thicknesses are between 20 µm and 60 µm.

A large number of different materials are available as starting materials, which can be in the form of powder or granules, but also in the form of fluids, for example as suspensions. In generative manufacturing methods, the three-dimensional object is formed by a large number of individual material layers, which are deposited successively on a lowerable building or production platform and are subsequently subjected individually to a locally selective consolidation process.

A method for selective laser melting is known for example from EP 1 355 760 B1.

It is known that additively manufactured parts frequently have anisotropic material or structural properties and accordingly their strength or stability and thus applicability for particular requirements is direction dependent. A problem in this regard can be that a property of the part, for example a strength or load capacity thereof, is insufficient for a specific application for manufacturing reasons.

SUMMARY OF INVENTION

Therefore, it is an object of the present invention to specify means with which additively manufactured parts are usable in a more versatile manner. In particular, weaknesses that are inherent to additive manufacturing technologies, for example relating to the structure of the corresponding material, can be compensated by the method according to the invention. In particular, a part can be built up additively by the present method such that its structure or other properties of the part are optimized for the requirements.

This object is achieved by the subject matter of the independent claims. Advantageous refinements are the subject matter of the dependent claims.

One aspect of the present invention relates to a method for determining the orientation of a part to be additively manufactured, comprising the providing of a part geometry for the part to beam additively manufactured. The part geometry can for example be predetermined and/or be in the form of technical drawings or control programs of computer-aided manufacturing (CAM).

The method furthermore comprises the defining of at least one property of the part to be additively manufactured. The property denotes advantageously a physical variable or requirement, with regard to which an orientation of the part can advantageously be optimized with the present invention as part of additive manufacturing.

The method furthermore comprises the analyzing of a direction dependence or anisotropy of said property depending on the part geometry that is provided or present. In particular, direction dependence of the mechanical properties of the part can depend on its geometry, for example its width, length, diameter or specific shape. In particular, properties of additively manufactured parts, as described above, frequently vary along spatial axes or (main) axes of symmetry of the part.

The method furthermore comprises the determining and/or displaying, in an additive manufacturing plant, of one or more preferred orientations of the part to be additively manufactured, on the basis of the analysis of the direction dependence. The preferred orientation can be a favorable or optionally also an optimal orientation.

The term "orientation" means a direction preferably of one or more main axes of symmetry of the part relative to a buildup direction of the additive manufacture. In particular, the orientation can denote a spatial angle or vector, which defines the direction of a main axis of symmetry of the part (geometry) for example relative to the buildup direction.

A buildup direction of the additive manufacture can be in particular dependent on the particular production technology. In the case of powder-bed-based production methods, the buildup direction is oriented for example perpendicularly to a surface formed by the powder bed.

In one refinement, the part geometry, or the design of the part, is provided or specified by or with the aid of computer-aided design (CAD). In other words, the design of the part is advantageously already defined and is available in the form of technical drawings or a CAD file.

The property is a material- and geometry-dependent property or a property that depends on the material of the part to be additively manufactured, or the starting material thereof, and/or on its design or its geometry.

In one refinement, the property is a property dependent on the production of the part. In particular, the above-described direction dependence of the property can depend on the particular additive manufacturing method.

In one refinement, the property is a mechanical property of the part to be additively manufactured.

In one refinement, the property is a tensile strength or tensile load capacity of the part to be additively manufactured.

In one refinement, the property is a pressure resistance or pressure load capacity of the part to be additively manufactured.

In one refinement, the property is a compressive strength or compressive load capacity of the part to be additively manufactured.

In one refinement, the property is a bending strength or bending load capacity of the part to be additively manufactured.

In one refinement, the property is a torsional strength or torsional load capacity of the part to be additively manufactured.

In one refinement, the property is a creep strength or creep load capacity of the part to be additively manufactured.

In one refinement, the property is a shear strength or shear load capacity of the part to be additively manufactured.

In one refinement, the property is a surface property, for example a surface roughness, of the part to be additively manufactured.

Each of the mentioned properties or further properties can be advantageously optimized, in the context of the present method, for the part to be additively manufactured, or in terms of its individual geometry and/or requirements.

In one refinement, the direction dependence is analyzed by means of a numerical simulation, for example a finite element method.

In one refinement, the direction dependence is analyzed by means of an empirical, approximating and/or phenomenological method.

In one refinement, the described method is implemented in a software module for numerical simulation and/or in a module for computer-aided design.

In one refinement, the direction dependence of the property is analyzed on the basis of a structural analysis of, for example previously, additively manufactured material. The property can be in particular material-dependent. Primarily, in this connection, the crystal structure and generally the material phases of the part can be analyzed.

In one refinement, the (direction) dependence of the property is analyzed at least in a buildup direction of the additive manufacture.

In one refinement, the (direction) dependence of the property is analyzed at least in a buildup direction of the additive manufacture and in a direction perpendicular to the buildup direction.

Said buildup direction is advantageously a buildup direction that is characteristic for each particular additive manufacturing method. Advantageously, the direction dependence is analyzed in a large number of different directions, for example directions inclined relative to the buildup direction.

In one refinement, the direction dependence of the property is analyzed empirically, for example on the basis of experimental values or simulations.

In one refinement, a result of the analysis of the direction dependence and/or a result of the determination of the orientation of the part to be additively manufactured is saved in a database. As a result of this refinement, the additive manufacturing technology can be improved in a particularly advantageous manner, since it is possible to resort for example to empirical evidence.

In one refinement, the result is used for a subsequent method for determining a further orientation, for example of a further part to be additively manufactured.

In one refinement, a plurality of preferred orientations are determined as part of the described method.

In one refinement, an optimal orientation of the part to be additively manufactured, expediently relative to a buildup direction, is displayed to the user of the described method.

In one refinement, for example following the determination of the plurality of favorable or preferred orientations, the preferred orientations are displayed to a user of the described method, wherein the user can choose between the different preferred orientations.

A further aspect of the present invention relates to a method for the additive manufacture of a part, comprising the described method for determining the orientation of the part. The method for additive manufacture further comprises the additive buildup of the part on a building platform of the plant in the particular optimal orientation or in a, for example selected, preferred orientation.

In one refinement, the above-described method or at least parts thereof is/are implemented by software or a data processing program, for example CAD or CAM software.

A further aspect of the present invention relates to a computer-readable medium, comprising executable program instructions that are suitable for having a data processing device carry out the steps of analyzing and determining as described above.

Configurations, features and/or advantages which relate to the device and/or the plant in the present case can also relate to the method and/or the part, and vice versa.

BRIEF DESCRIPTION OF THE DRAWINGS

Further details of the invention are described in the following text with reference to the drawings.

DETAILED DESCRIPTION OF INVENTION

Figure 1:
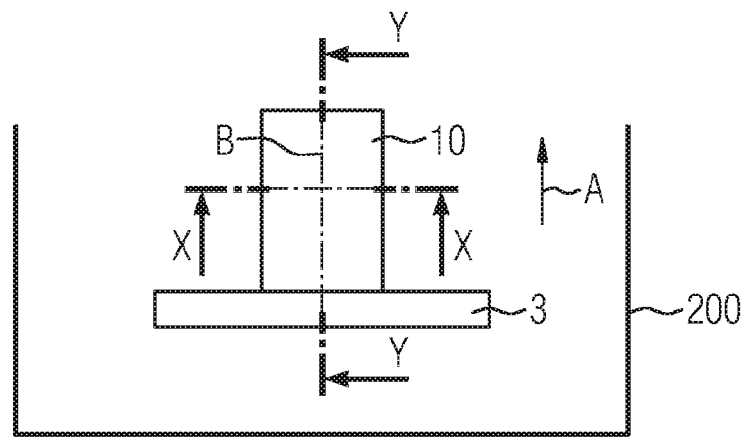
FIG. 1 shows a schematic sectional or side view of an additively built-up part.

FIG. 1 shows a building platform 3. Arranged on the building platform 3 is a part 10. The part 10 can have been built up or produced either completely or only partially and can accordingly still be in production or in additive buildup. The part 10 has advantageously been produced or is producible by an additive manufacturing method, advantageously by means of selective laser melting (SLM) on the building platform 3. In this case, the part 10 is connected to the building platform 3 advantageously cohesively and/or metallurgically. Alternatively, the part can also have been or be produced or built up by other additive manufacturing methods, for example selective laser sintering, electron beam melting or laser metal deposition (LMD).

The part 10 is expediently additively built up in a buildup or layer direction A (see below). In the case of powder-bed-based methods, for example selective laser melting, the buildup direction A is fixed or invariable. The surface of a corresponding powder bed (not explicitly illustrated) is oriented advantageously with its surface normal parallel to the buildup direction A.

For example in the case of a part to be manufactured by laser metal deposition, the buildup direction can be variable or changeable, for example depending on the arrangement of a powder nozzle or of a corresponding exposure laser.

The part 10 has a main axis of symmetry B. The main axis of symmetry B corresponds to a longitudinal axis of the part 10, wherein, merely by way of example, a simple rectangular, or as seen in three dimensions, cuboidal geometry, has been selected. In the present case, the main axis of symmetry B is parallel to the buildup direction A.

Also indicated in FIG. 1, with the reference sign 200, is an additive manufacturing plant, to which the building platform 3 can also belong.

Furthermore, a section plane, section axis or section direction X is indicated in FIG. 1.

Figure 2:
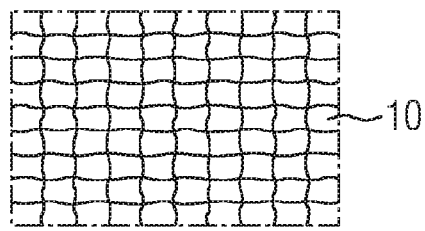
FIG. 2 shows a schematic simplified distribution of crystal grains of the part from FIG. 1 in section along the axis X in FIG. 1.

FIG. 2 shows a simplified schematic section of the part 10 on the plane X-X indicated in FIG. 1. A large number of regions 1 are illustrated. The regions 1 indicate in particular a polycrystalline material or grain structure, wherein each region 1 or each field has a particular crystal orientation, grain orientation or material phase, for example with contiguous crystalline regions (material grains). In other words, a polycrystalline material structure is discernible, as is characteristic, in section in the direction X, for a part built up by SLM.

Figure 3:
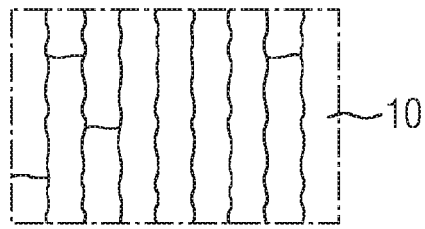
FIG. 3 shows a schematic simplified distribution of crystal grains of the part from FIG. 1 in section in a direction perpendicular to the axis X.

FIG. 3 shows a simplified schematic section of the part 10 on the plane Y-Y indicated in FIG. 1. In particular a stalk-like material or grain structure is discernible, wherein—analogously to FIG. 2—the regions 1 are intended to represent individual material grains and/or crystal orientations. In contrast to FIG. 2, it is apparent from FIG. 3 that the regions 1 or crystal grains "grow", have been built up or produced substantially in the buildup direction A, whereas FIG. 2 shows merely a uniform polycrystalline distribution.

As a result of the much coarser or more directed grain distribution in FIG. 3, in contrast to FIG. 2, the anisotropy or direction dependence of additive manufacturing methods is clear from the example of selective laser melting. Said anisotropy is due in particular to the layer-wise buildup and/or the conditions that arise during production, such as temperature gradients, and the melting and consolidation operations of the parts.

In particular, creep strength of the part 10 in the buildup direction A—relative to a direction perpendicular thereto—for example the direction X in FIG. 1—is increased.

As a further property of additively manufactured or manufacturable parts, it is possible for example for a surface property, such as a surface roughness, of the part to depend on the particular orientation relative to the buildup direction.

Direction dependence can also exist, similarly to the described situation, for further material properties, for example tensile strength, pressure resistance, compressive strength, bending strength, torsional strength or shear strength, or tensile load capacity, pressure load capacity, compressive load capacity, bending load capacity, torsional load capacity or shear load capacity. All the mentioned physical variables or properties can be in particular dependent on the (additive) manufacturing technology; or the anisotropy of the properties can depend on the manufacturing method. In this case, it is not absolutely necessary for a buildup direction A to define the direction of the most favorable or particularly advantageous properties. Rather, the direction that is preferred, favorable or optimal in this sense can be any spatial direction, which also does not have to coincide with an axis of symmetry of the part (cf. FIG. 5).

Figure 4:
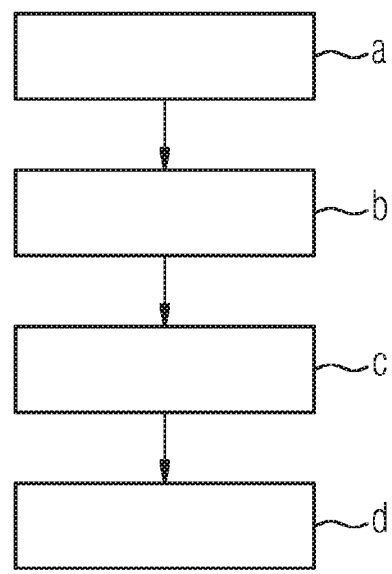
FIG. 4 indicates method steps of the method according to the invention by way of a schematic flow diagram.

FIG. 4 shows a schematic flow diagram, which indicates the method according to the present invention.

The method according to the invention can be or comprise a preparatory method for additive manufacture or a finishing method.

In method step a), a design or a part geometry is defined or provided. Normally, the part geometry for the additive manufacture of the part is provided by CAD or CAM data or in the form of technical drawings, which are then advantageously intended to be put into a computer-readable form.

Method step b) describes the defining of a specific property of the part to be additively manufactured, which, in the case of a computer-based method—implemented for example by CAM and/or CAD software—should generally be input or edited by the user via a user interface. In other words, the user of the additive manufacturing plant 200 or a user of the method chooses that property that he wishes to optimize with regard to the orientation of the part. This property can be a mechanical property, for example one of the abovementioned properties, a direction- and/or material-dependent property, or a thermal property.

Method step c) then describes the analysis of direction dependence (see above) of the property, which can be dependent on the part geometry. This can be implemented for example by means of a numerical simulation, for example a finite element method.

As an alternative to a numerical method, it is alternatively possible to choose an empirical, phenomenological or approximating method for the analysis of the direction dependence.

Furthermore, the direction dependence of the property can be analyzed on the basis of a structural analysis of, for example previously, additively manufactured material. For the analysis of the direction dependence, material parameters or standard parameter sets can be read in, for example from a database, in order for it to be possible to analyze the direction dependence at all or to improve the latter.

In particular, the mentioned direction dependence can be material-dependent and/or method-dependent. Advantageously, the dependence of the property is analyzed or implemented at least in the buildup direction A or in a direction perpendicular to the buildup direction A.

Method step d) denotes the determination and/or the display of one or more preferred orientations and/or of an optimal orientation of the part to be additively manufactured, in the plant 200 or relative to a surface of the building platform 3 on the basis of the analysis of the direction dependence or the result thereof.

In the context of the present invention, provision is also made for a result of the analysis of the direction dependence or a result of the determination of the orientation to be saved in a database and to be used for a subsequent method for determining a further orientation of a part 10 to be additively manufactured. In particular, a "best fit", as it is known, can be calculated and subsequently chosen by the user.

The described method is advantageously furthermore integrated or implemented in an additive manufacturing method, wherein the part 10, after the determination of the preferred orientation—as described—is also additively built up in accordance with this orientation, in order to achieve the desired, optimized material properties.

Figure 5:
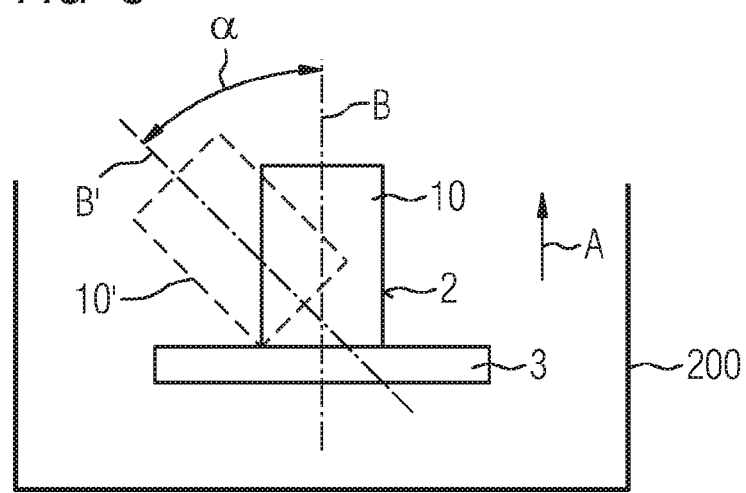
FIG. 5 schematically indicates different orientations of a part in an additive manufacturing plant.

FIG. 5 schematically illustrates a sectional or side view of a part 10 in a similar manner to FIGS. 1 and 2. The part 10 illustrated in a manner contoured by solid lines advantageously corresponds, with the indicated main axis of symmetry B, to a conventional orientation of the part in a production chamber of the plant 200. The example 10' illustrated in a manner contoured by dashed lines advantageously indicates, by means of its main axis of symmetry B', an orientation which has been determined by means of the above-described method (cf. FIG. 4) and is inclined by the angle α relative to the direction B or the buildup direction A. In particular, the part 10' can be additively built up such that, with regard to its mechanical tensile or pressure load capacity, or tensile strength or pressure resistance, it is optimized during operation or has preferred or optimal properties.

Additive manufacturing methods are based advantageously on 3D CAD/CAM data. Following the determination of the orientation of the part, the data are expediently processed such that all information relating to the production of the part and the relative orientation thereof is available. The described additive orientation is implemented by the additive buildup or the corresponding production is implemented by the processing of the data ("slicing").

By the described method, the part 10, 10' can be oriented on the building platform 3 and optimized in terms of its properties such that the part regions having the greatest stress, the greatest mechanical pressure load or the greatest tensile load—simulated or optimized for example by FEM analysis—have the best mechanical properties.

In the case of turbine blades, built up from the powder bed, as parts, the direction, for example, with the best creep strength corresponds—as described above—to the buildup direction A.

The orientation of the part can furthermore be optimized with regard to its surface 2, for example with regard to the roughness or "stepped-ness", by the described method.

Furthermore, the orientation can be determined such that—for additive buildup—as few faces as possible have to be supported with a support structure.

In the context of the present invention, provision is also made for one or more properties to be able to be selected for an additive manufacturing process, with regard to which properties an orientation is determined or ascertained for production. In particular, several properties can be selected, the direction dependence thereof analyzed, and the overall optimal orientation or several preferred orientations output to the user of the manufacturing method, for example via an appropriate display element or the user interface.

The invention is not limited to the exemplary embodiments by the description thereof, but rather encompasses every new feature and every combination of features. This includes in particular every combination of features in the claims, even when this feature or this combination itself is not explicitly specified in the claims or exemplary embodiments.

The invention claimed is:

1. A method for determining an orientation of a part to be additively manufactured, comprising:
    a) providing a part geometry for the part to be additively manufactured,
    b) defining a property of the part to be additively manufactured, wherein the property is a material-dependent and geometry-dependent property,
    c) analyzing a direction dependence of the property depending on the part geometry,
    d) determining a preferred orientation, in an additive manufacturing plant, of the part to be additively manufactured, on a basis of the analysis of the direction dependence, wherein the direction dependence of the property is analyzed on a basis of a structural analysis of previously additively manufactured material, and
    e) additively manufacturing the part in the preferred orientation.

2. The method as claimed in claim 1,
    wherein the part geometry is provided with an aid of computer-aided design.

3. The method as claimed in claim 1,
    wherein the property is a property dependent on a production of the part.

4. The method as claimed in claim 1,
    wherein the material-dependent property is a tensile strength, pressure resistance, compressive strength, bending strength, torsional strength, creep strength or shear strength, or a tensile load capacity, pressure load capacity, compressive load capacity, bending load capacity, torsional load capacity, creep load capacity or shear load capacity of the part to be additively manufactured.

5. The method as claimed in claim 1,
    wherein the direction dependence of the property is analyzed by means of a numerical simulation.

6. The method as claimed in claim 1,
    wherein the direction dependence of the property is analyzed in a buildup direction of the additive manufacture and a direction perpendicular to the buildup direction.

7. The method as claimed in claim 1,
    wherein a result of the analysis of the direction dependence is saved in a database and used for a subsequent method for determining a further orientation of a part to be additively manufactured.

8. The method as claimed in claim 1,
    wherein a plurality of preferred orientations are determined, wherein the plurality of preferred orientations are subsequently displayed to a user of the method, and wherein the plurality of preferred orientations are selectable by the user.

9. A method for the additive manufacture of a part, comprising:
    determining an orientation of the part to be additively manufactured by:
        a) providing a part geometry for the part to be additively manufactured, the part geometry comprising a line of symmetry,
        b) defining a property of the part to be additively manufactured, wherein the property is a material- and geometry-dependent property,
        c) analyzing a direction dependence of the property depending on the part geometry, and
        d) determining a preferred orientation relative to a direction of buildup, in an additive manufacturing plant, of the line of symmetry of the part geometry of the part to be additively manufactured, on a basis of the analysis of the direction dependence; and
    additively building up of the part on a building platform of the additive manufacturing plant in a determined preferred orientation.

10. A non-transitory computer-readable medium, comprising:
    executable program instructions stored thereon and configured to have a data processing device carry out the method as claimed in claim 1.

11. The method as claimed in claim 1, wherein the preferred orientation is of a line of symmetry of the part geometry of the part relative to a direction of buildup.

12. The method as claimed in claim 1, wherein the structural analysis analyses a crystal structure and material phases of the previously additively manufactured material.

* * * * *